US007740687B2

(12) United States Patent
Reinhold, III

(10) Patent No.: US 7,740,687 B2
(45) Date of Patent: Jun. 22, 2010

(54) PRESSURE SWING ADSORPTION METHOD AND SYSTEM FOR SEPARATING GAS COMPONENTS

(75) Inventor: Herbert E. Reinhold, III, The Woodlands, TX (US)

(73) Assignee: IACX Energy LLC, Dallas, TX (US)

( * ) Notice: Subject to any disclaimer, the term of this patent is extended or adjusted under 35 U.S.C. 154(b) by 677 days.

(21) Appl. No.: 11/674,547

(22) Filed: Feb. 13, 2007

(65) Prior Publication Data

US 2008/0190290 A1 Aug. 14, 2008

(51) Int. Cl.
*B01D 53/02* (2006.01)

(52) U.S. Cl. ............................................ 95/96; 96/130

(58) Field of Classification Search ..................... 95/96, 95/100, 103, 105; 96/130

See application file for complete search history.

(56) References Cited

U.S. PATENT DOCUMENTS 4,278,621 A 7/1981 Sigmund et al. ........ 261/114 R
4,297,329 A 10/1981 Sigmund et al. ............ 423/228
4,705,541 A 11/1987 Sircar ............................ 55/26
4,725,293 A 2/1988 Gunderson ................... 55/162
4,756,723 A 7/1988 Sircar ............................ 55/25
4,816,039 A 3/1989 Krishnamurthy et al. ....... 55/26
5,171,333 A 12/1992 Maurer ........................... 55/26
5,174,796 A 12/1992 Davis et al. .................... 55/26
5,238,503 A * 8/1993 Phenix et al. ................. 134/37
5,407,465 A * 4/1995 Schaub et al. .................. 95/14
5,536,300 A 7/1996 Reinhold, III et al. ......... 95/101
6,010,555 A 1/2000 Smolarek et al. ............... 95/98
6,156,100 A 12/2000 Conrad et al. .................. 95/98
6,162,283 A 12/2000 Conrad et al. .................. 95/98
6,197,092 B1 3/2001 Butwell et al. ................. 95/96
6,315,817 B1 11/2001 Butwell et al. ................. 95/96
6,387,159 B1 5/2002 Butwell et al. ................. 95/99
6,444,012 B1 9/2002 Dolan et al. ................... 95/99
6,497,750 B2 12/2002 Butwell et al. ................. 95/96
6,508,863 B1 1/2003 Byrne et al. .................. 95/143
6,521,020 B2 2/2003 Butwell et al. ................. 95/99

(Continued)

FOREIGN PATENT DOCUMENTS

DE 019941057 C1 1/2001

(Continued)

OTHER PUBLICATIONS

Engelhard Corporation, *Advancing the quality, health and safety of environmental resources*, www.engelhard.com, 6 pages, printed on Jun. 5, 2007.

(Continued)

*Primary Examiner*—Robert A Hopkins
(74) *Attorney, Agent, or Firm*—Baker Botts L.L.P.

(57) ABSTRACT

A pressure swing adsorption method for separating gas components includes pressurizing an adsorption bed to an adsorption pressure using a first gas component of a feed gas, the adsorption bed including an adsorbent for substantially adsorbing a second gas component of a feed gas; introducing the feed gas to the pressurized adsorption bed, wherein the first gas component of the feed gas substantially passes through the pressurized adsorption bed and the second gas component of the feed gas substantially adsorbs onto the adsorbent; and depressurizing the pressurized adsorption bed to recover at least a portion of the second gas component of the feed gas in the pressurized adsorption bed.

32 Claims, 4 Drawing Sheets

U.S. PATENT DOCUMENTS

| | | | | |
|---|---|---|---|---|
| 6,610,124 | B1 | 8/2003 | Dolan et al. | 95/98 |
| 6,849,106 | B2 | 2/2005 | Le Bec | 95/97 |
| 2005/0098034 | A1 | 5/2005 | Gittleman et al. | 95/96 |

FOREIGN PATENT DOCUMENTS

| | | | |
|---|---|---|---|
| EP | 0 175 804 | A1 | 4/1986 |
| EP | 0 281 876 | A1 | 9/1988 |
| GB | 2414941 | A | 12/2005 |
| JP | 410277343 | A | 10/1998 |
| JP | 411197434 | A | 7/1999 |
| WO | WO 86/05119 | | 9/1986 |
| WO | WO/ 02/058818 | A2 | 8/2002 |

OTHER PUBLICATIONS

Engelhard Corporation, *Solutions for fuel purification*, www.engelhard.com, 4 pages, printed on Jun. 5, 2007.

Guild Associates, Inc., *Nitrogen Rejection and Co2 Removal Made Easy*, www.moleculargate.com, 82 pages, printed on Jun. 5, 2007.

PCT Notification of Transmittal of the International Search Report and the Written Opinion of the International Searching Authority, or the Declaration mailed Jul. 18, 2008 regarding PCT/US2008/052645 filed Jan. 31, 2008 (14 pages), Jul. 18, 2008.

Ruthven, D.M., et al., "Pressure Swing Adsorption," (John Wiley & Sons, Inc.), Wiley-VCH, pp. 67-94, pp. 221-264, and pp. 327-343, © 1994.

* cited by examiner

10
NON-ADSORBED GAS
30
PRODUCT GAS
FEED GAS
PLC
28a
28b
28c
28d
28e
26a
26b
26c
26d
26e
22a
22b
22c
22d
22e
20a
20b
20c
20d
20e
36a
36b
36c
36d
36e
BED A
12a
BED B
12b
BED C
12c
BED D
12d
BED E
12e
32a
32b
32c
32d
32e
34a
34b
34c
34d
34e
24a
24b
24c
24d
24e
VACUUM PUMP
14
BUFFER
16
COMPRESSOR
18

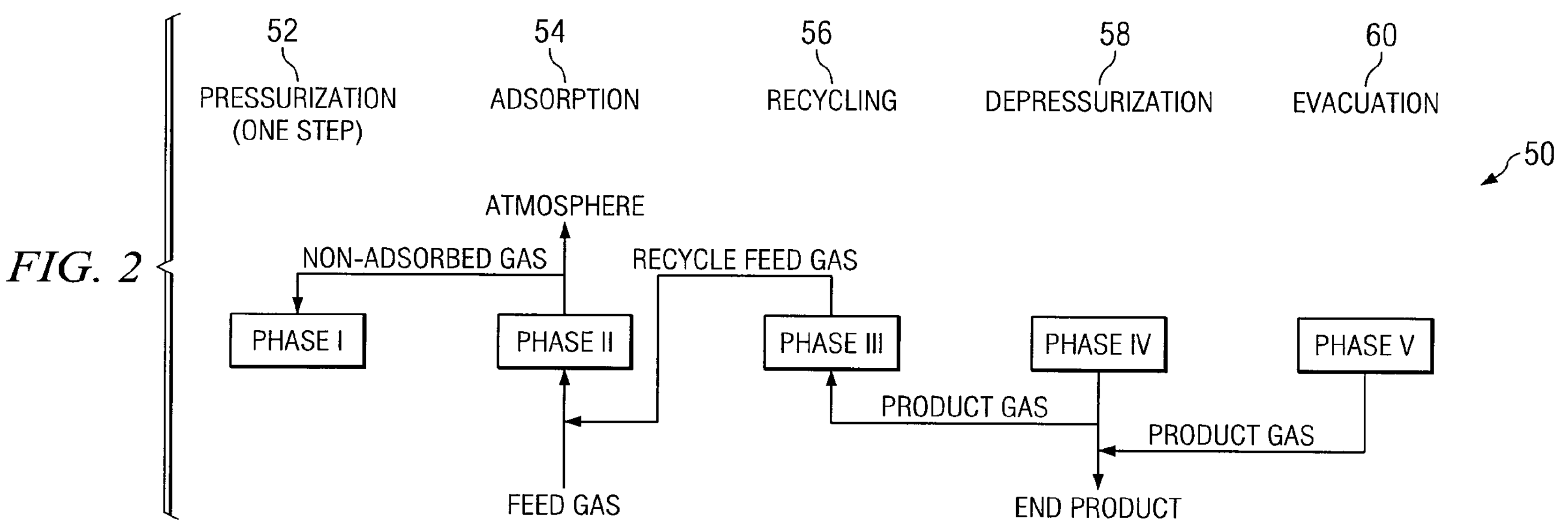

*FIG. 2*

| TIME \ ADSORBENT BED | BED A | BED B | BED C | BED D | BED E |
|---|---|---|---|---|---|
| 1-90 SECONDS | PRESSURIZATION | ADSORPTION | RECYCLING | DEPRESSURIZATION | EVACUATION |
| 90-180 SECONDS | ADSORPTION | RECYCLING | DEPRESSURIZATION | EVACUATION | PRESSURIZATION |
| 180-270 SECONDS | RECYCLING | DEPRESSURIZATION | EVACUATION | PRESSURIZATION | ADSORPTION |
| 270-360 SECONDS | DEPRESSURIZATION | EVACUATION | PRESSURIZATION | ADSORPTION | RECYCLING |
| 360-450 SECONDS | EVACUATION | PRESSURIZATION | ADSORPTION | RECYCLING | DEPRESSURIZATION |

*FIG. 3*

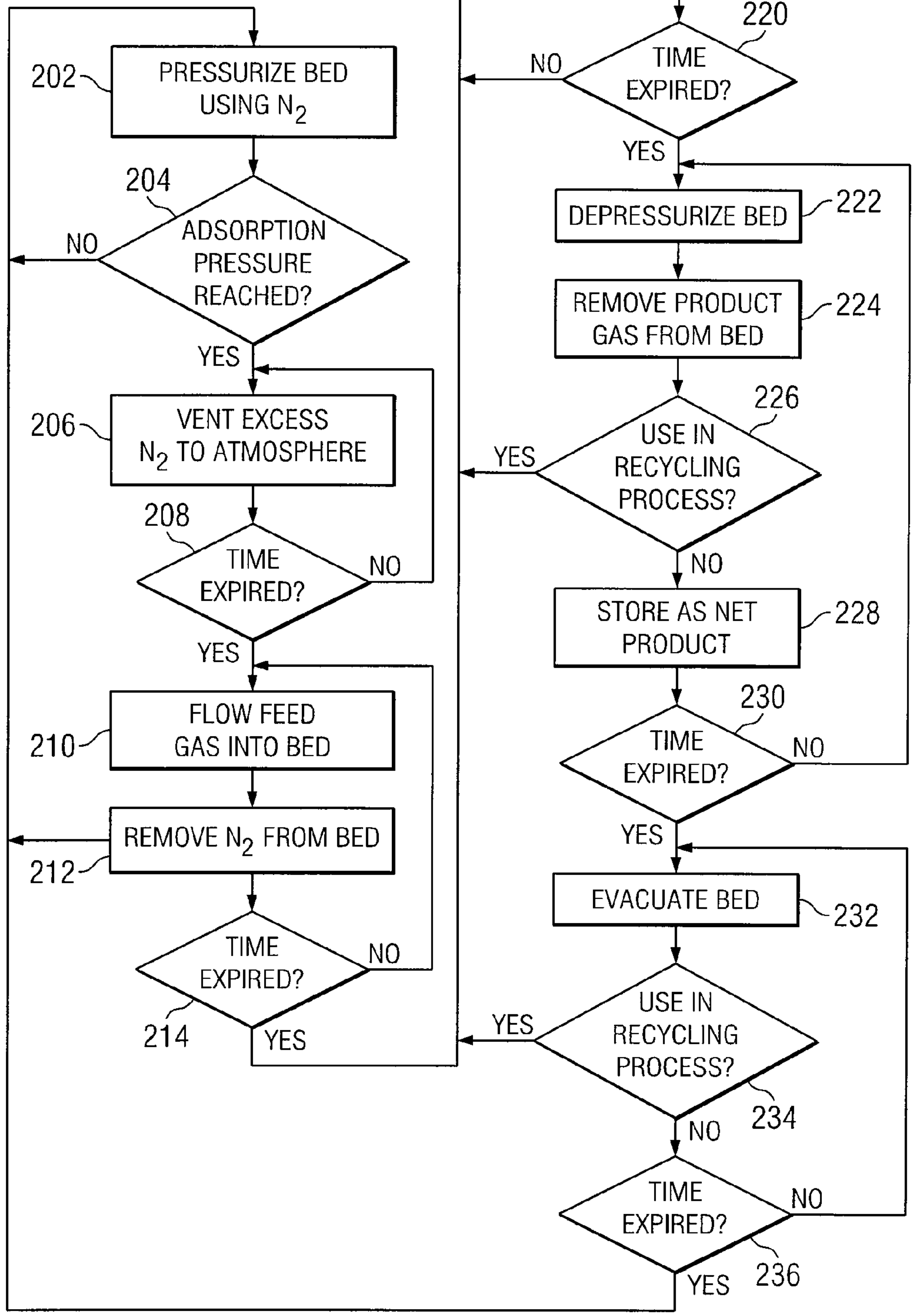
200
FIG. 5
PRESSURIZE BED USING $N_2$
202
ADSORPTION PRESSURE REACHED?
204
NO
YES
VENT EXCESS $N_2$ TO ATMOSPHERE
206
TIME EXPIRED?
208
NO
YES
FLOW FEED GAS INTO BED
210
REMOVE $N_2$ FROM BED
212
TIME EXPIRED?
214
NO
YES
FLOW PRODUCT GAS INTO BED
216
REMOVE FEED GAS FROM BED
218
TIME EXPIRED?
220
NO
YES
DEPRESSURIZE BED
222
REMOVE PRODUCT GAS FROM BED
224
USE IN RECYCLING PROCESS?
226
YES
NO
STORE AS NET PRODUCT
228
TIME EXPIRED?
230
NO
YES
EVACUATE BED
232
USE IN RECYCLING PROCESS?
234
YES
NO
TIME EXPIRED?
236
NO
YES

PRESSURE SWING ADSORPTION METHOD AND SYSTEM FOR SEPARATING GAS COMPONENTS

TECHNICAL FIELD OF THE INVENTION

The present invention relates generally to separating gas components, and, more particularly, to a pressure swing adsorption method and system for separating gas components.

BACKGROUND OF THE INVENTION

Gases often include impurities and contaminants. For example, natural gas retrieved from the ground using wells often includes nitrogen, a common contaminating gas. Similarly, biogas often includes nitrogen, oxygen, and/or carbon dioxide. In some instances, as much as eighty percent of natural gas is nitrogen, and as much as twenty percent of biogas is nitrogen. Various attempts have been made to devise systems and processes for removing contaminating gases or otherwise separating components of gas. Each, however, involves inefficiencies.

SUMMARY OF THE INVENTION

In accordance with the present invention, techniques for separating gas components using a pressure swing adsorption method and system are provided. According to some embodiments, these techniques can enable the removal of contaminating gases from natural gas and/or biogas.

According to a particular embodiment, a pressure swing adsorption method for separating gas components includes pressurizing an adsorption bed to an adsorption pressure using a first gas component of a feed gas, the adsorption bed including an adsorbent for substantially adsorbing a second gas component of a feed gas; introducing the feed gas to the pressurized adsorption bed, wherein the first gas component of the feed gas substantially passes through the pressurized adsorption bed and the second gas component of the feed gas substantially adsorbs onto the adsorbent; and depressurizing the pressurized adsorption bed to recover at least a portion of the second gas component of the feed gas in the pressurized adsorption bed.

According to a particular embodiment, a pressure swing adsorption system for separating gas components includes a first and second adsorption bed. The first adsorption bed is operable to receive a feed gas, wherein a first gas component of the feed gas substantially passes through the first adsorption bed and a second gas component of the feed gas substantially adsorbs onto an adsorbent in the first adsorption bed. The first adsorption bed is further operable to transmit the first gas component of the feed gas passing through the first adsorption bed to a second adsorption bed. The second adsorption bed is coupled to the first adsorption bed and is operable to receive the first gas component of the feed gas and to pressurize the second adsorption bed to an adsorption pressure using the first gas component of the feed gas.

Embodiments of the invention provide various technical advantages. For example, these techniques may separate gas components found in a gas, such as natural gas recovered from the ground. Furthermore, inefficiencies associated with previous methods and systems may be eliminated. For example, these techniques may reduce or eliminate a second phase of pressurization used in other gas separation systems and processes. More hydrocarbons in a particular volume of natural gas may be separated from impurities and contaminants. Similarly, embodiments of the disclosed invention may result in a product gas that includes less impurities and contaminants. Furthermore, less hydrocarbons may be lost during processing. According to some embodiments, these techniques may reduce the number of receiving tanks utilized in other gas separation systems and processes. Similarly, these techniques may allow capital costs to be allocated to additional adsorption beds rather than receiver tanks. Another advantage is that less hydrocarbons may be used to clear contaminating gases from adsorption beds. As another example, smaller adsorption beds may be utilized using the disclosed techniques. Furthermore, costs may be reduced.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 is a schematic illustrating phases of a pressure swing adsorption method for separating gas components;

FIG. 3 is a chart indicating phases of a pressure swing adsorption process practiced by adsorption beds;

FIG. 5 is a flowchart illustrating a method for separating gas components using a pressure swing adsorption system.

DETAILED DESCRIPTION OF THE DRAWINGS

Figure 1:
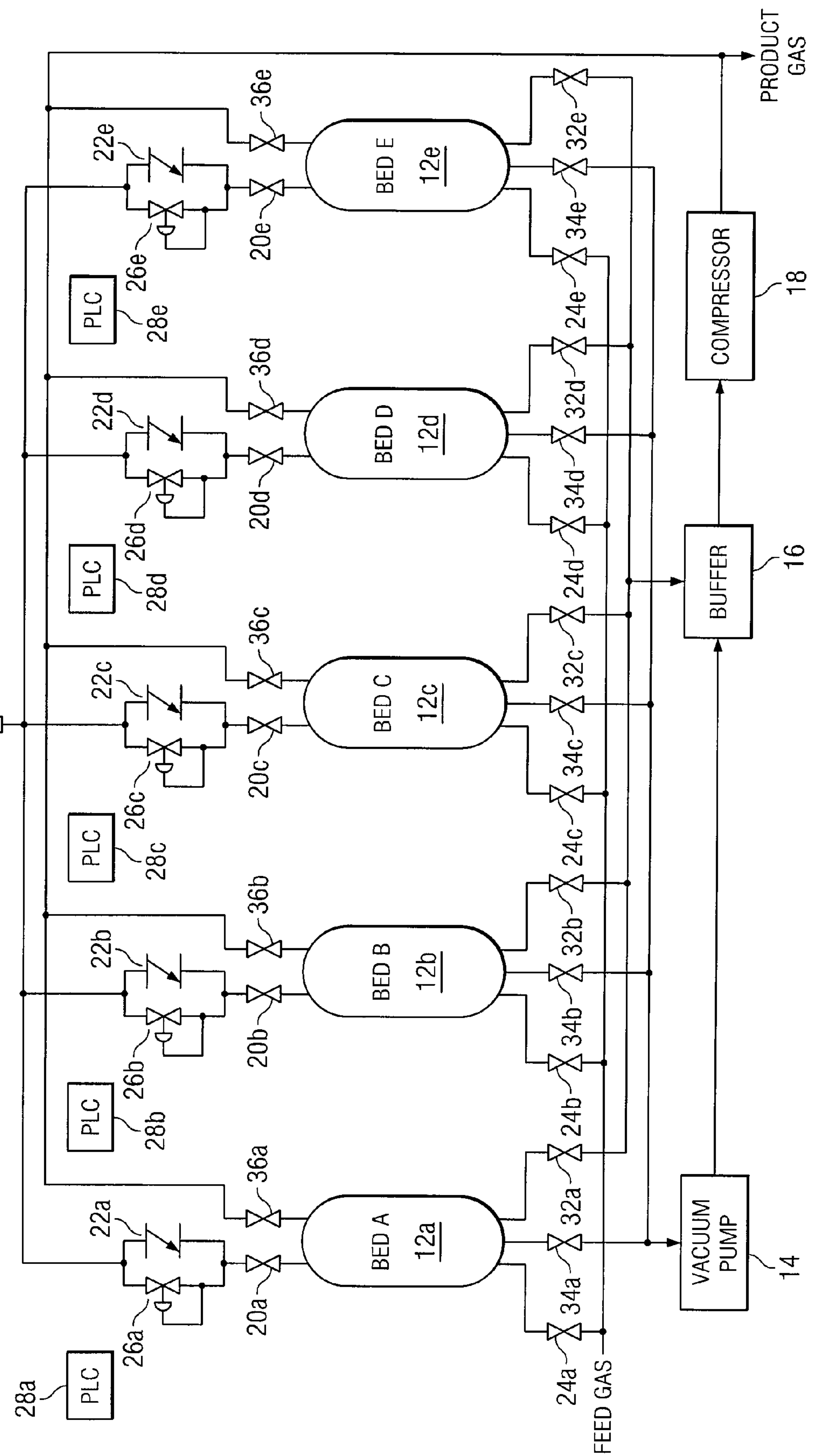
FIG. 1 illustrates an adsorption bed system for separating gas components using a pressure swing adsorption method.

FIG. 1 illustrates a pressure swing adsorption system, indicated generally at 10, that includes a number of adsorption beds 12, a vacuum pump 14, a buffer 16, and a compressor 18. Adsorption beds 12 couple to vacuum pump 14, buffer 16, and compressor 18 through various independent and interconnected pipes. Adsorption beds 12 couple to numerous other devices, including valves 20, check valves 22, feed gas valves 24, back pressure regulators 26, control logics 28, a vent valve 30, depressurization valves 32, evacuation valves 34, and recycle valves 36. The elements of system 10 can operate to separate gas components of a feed gas, such as natural gas, using a pressure swing adsorption method. For example, each adsorption bed 12 may cycle through various phases of a pressure swing adsorption process using the various elements of system 10 to separate nitrogen and/or other contaminants from hydrocarbons in natural gas recovered from the ground using wells and/or in biogas recovered, for example, from landfills, sewers, and digesters.

Adsorption beds 12 represent pressure tanks that include adsorbent material used to separate components of gas. Sizes of adsorption beds 12 may vary and depend upon factors such as the particular gas stream, gas flows, hydrocarbon content, and other factors such as capital costs. For example, adsorption beds 12 may range in height, for example, from about 2 to about 6 meters or more, and the width or diameter of each adsorption bed 12 may range, for example, from about 1 meter to about 4 meters or more. Flow rates of gas through adsorption beds 12 may also vary, for example, between about 200 to about 10,000 scf/minute depending on the size of the particular adsorption bed 12.

Each adsorption bed 12 may contain various amounts of adsorbent. For example, about 1,000 to about 40,000 pounds of adsorbent may be utilized. Any appropriate amount, however, may be used. Furthermore, the adsorbent in adsorption beds 12 may be selected from various adsorbents as appropriate. For example, an adsorbent may be selected that, relatively speaking, strongly adsorbs hydrocarbon content of natural gas while, relatively speaking, weakly adsorbs contaminating gases that might be found in natural gas, such as nitrogen. A selected adsorbent may be an activated carbon derived, for example, from wood, coal, coconut, or petroleum sources. Adsorbent characteristics that determine affinity for hydrocarbons include pore structure, pore size, and treatment conditions. Examples of suitable carbon may have a carbon tetrachloride number of about 60 g./100 g., a surface area of more than about 1000 sq. meters/g., a density of about 0.45 g./cc., and an average particle diameter of about 3 to 5 mm, and in some embodiments may be about 4 mm. However, any adsorbent may be used depending on the relative affinity for relevant gas components.

Vacuum pump 14 represents a device capable of evacuating gas from one or more adsorption beds 12. For example, in one embodiment vacuum pump 14 may be a pump capable of vacuum levels of about 15 to about 29 inches Hg. Buffer 16 represents a device for storing a desired component of feed gas, such as a hydrocarbon. For example, buffer 16 may be a bladder or tank or any other appropriate vessel capable of storing a hydrocarbon received from adsorption beds 12. Compressor 18 represents a device capable of compressing gas. Any appropriate device for compressing gas may be selected based on a desired pressure, volume, and/or flow rate, any of which may be affected by the number and volume of adsorption beds 12, as well as the numbers and links of independent and interconnecting pipes coupling together various elements of system 10.

Valves 20 represent any of various devices utilized to control flow of gases into and out of adsorption beds 12. Standard valves may be used. On/off valves may be utilized, including butterfly valves. Alternatively or in addition, throttle and/or check valves may be utilized as appropriate. Check valves 22 represent devices that normally allow gas to flow in only one direction. In the configuration represented in system 10, check valve 22 normally allows gas to flow only toward adsorption beds 12. Feed gas valves 24 represent any of various devices that allow feed gas to enter adsorption beds 12. Again, standard valves may be used. On/off valves may be utilized, including butterfly valves. Alternatively or in addition, throttle and/or check valves may be utilized as appropriate. Back pressure regulators 26 represent any of various devices that maintain appropriate back pressures. In the configuration represented in system 10, pressure may be regulated on the side of back pressure regulars 26 nearest adsorption beds 12. Back pressure regulators 26 may maintain adsorption pressures while pressurization of other adsorption beds 12 are occurring. As indicated, back pressure regulators 26 may be situated in parallel with check valve 22.

Control logics 28 represent any of various devices used to control elements of system 10. For example, control logics 28 may be programmable logic controllers (PLCs), computer hardware, computer software, desktop computers, mainframe computers, servers, clients, integrated circuits, or any other appropriate device. Furthermore, while illustrated as separate elements in system 10, control logics 28 may be a single device in one location on or outside system 10. Control logic 28 may be coupled to various elements of system 10 to control, for example, opening and/or closing of valves, operation of vacuum pump 14, compressor 18, and/or any other appropriate device in system 10.

Vent valve 30 represents any of various devices utilized to vent gas to atmosphere. For example, vent valve 30 may vent a non-adsorbed gas or a lightly or weakly-adsorbed gas not adsorbed during adsorption, such as nitrogen, to atmosphere. Depressurization valves 32 represent any of various devices utilized to control flow of gas out of adsorption beds 12. Depressurization valves 32 may be coupled to buffer 16 through piping. Evacuation valves 34 represents any of various devices utilized to control flow out of adsorption beds 12. Evacuation valves 34 may couple to vacuum pump 14 and, in turn, to buffer 16. Recycle valves 36 represent any of various devices utilized to control flow of gases, such as product gases like hydrocarbon gases, into adsorption beds 12. Recycle valves 36 couple to compressor 18. As above, standard valves may be used. On/off valves may be utilized, including butterfly valves. Alternatively or in addition, throttle and/or check valves may be utilized as appropriate.

In operation, adsorption beds 12 may separate gas components of a feed gas, such as natural gas retrieved from the ground, using a pressure swing adsorption process utilizing a one-step pressurization phase. Pressure swing adsorption gas separation involves flowing a gas mixture through adsorption beds 12. As the mixture passes through the adsorbent, certain components of the mixture will adsorb onto the adsorbent and certain components will pass through the bed, thereby separating certain components of the mixture. By cycling an adsorption bed through various process phases or steps, which may include, for example, adsorption, recycle, equalization, depressurization, evacuation, purge and/or repressurization, a continuous stream of gas can be separated using pressure swing adsorption methods.

As an adsorption process progresses, strongly-adsorbed gases of a feed gas may substantially adsorb onto adsorbent in one or more of the adsorption beds 12 while weakly-adsorbed gases of the feed gas substantially may not. For example, the more strongly-adsorbed components of natural gas, such as hydrocarbons, may adsorb onto a particular adsorption bed 12 while the less strongly-adsorbed components of the natural gas, such as nitrogen, mostly exit adsorption beds 12 without being adsorbed by the adsorbent.

The feed gas separated into its components using system 10 may include various forms of natural gas, including natural gas having various levels and/or combinations of hydrocarbons such as methane, ethane, propane, and/or other hydrocarbons. Furthermore, the feed gas may include various levels of contaminating gases, such as nitrogen. The nitrogen component of a feed gas may be between about 5 and about 80 percent of the feed gas. In particular embodiments, feed gas utilized in system 10 may include between about five and about fifty percent nitrogen. Thus, the components of the feed gas may include one or more of various hydrocarbons such as methane, ethane, and/or propane as well as one or more of various contaminant gases such as nitrogen. Each gas component may be labeled as a weakly-adsorbed, lightly-adsorbed, and/or non-adsorbed gas on the one hand, and a strongly-adsorbed, heavily-adsorbed, and/or adsorbed gas on the other hand, as appropriate. That is, the feed gas may include many components, including components that have differing adsorption tendencies. Thus, components may be labeled lightly-adsorbed versus heavily-adsorbed. However, this language does not necessarily indicate relative weights, but instead, indicates the relative adsorption properties of the components. Other terms may include greatly-adsorbed, strongly-adsorbed, weakly-adsorbed, non-adsorbing, or any other appropriate names. The desired component may be called product gas, and may include less than approximately six percent of contaminating gases such as nitrogen. However, other relative concentrations may be determined to be appropriate.

In the embodiment illustrated as system 10, five adsorption beds 12 are utilized. In particular embodiments, however, any appropriate number of adsorption beds 12 may be utilized. Any particular adsorption bed 12 may cycle through different phases of a pressure swing adsorption process. These phases may include pressurization, adsorption, recycling, depressurization, and evacuation. Five adsorption beds 12, or a multiple of five adsorption beds 12, may be an efficient configuration due to the possibility that each of the five adsorption beds 12 may progress through a separate phase of a five-step pressure swing adsorption process at any given time. Thus, for example, each adsorption bed 12 in system 10 may operate in a different phase of a five-step pressure swing adsorption method at a particular time. Moreover, each adsorption bed 12 may transition from one phase of a pressure swing adsorption method to a next phase of the pressure swing adsorption method at substantially the same time.

For example, in one embodiment at a particular time adsorption 12*a* may operate in a first phase while adsorption bed 12*b* operates in a second phase, adsorption bed 12*c* operates in a third phase, adsorption bed 12*d* operates in a fourth phase, and adsorption bed 12*e* operates in a fifth phase. Furthermore, when adsorption bed 12*a* transitions to a second phase, adsorption bed 12*b* may transition to a third phase, adsorption bed 12*c* may transition to a fourth phase, adsorption bed 12*d* may transition to a fifth phase, and adsorption bed 12*e* may transition to a first phase. This embodiment will be considered in more detail. However, any adsorption bed 12 may operate in any particular phase of a pressure swing adsorption method at any given time.

If adsorption bed 12*a* enters a pressurization phase, valve 20*a* may open to allow a lightly-adsorbed component of the feed gas, such as nitrogen, to enter adsorption bed 12*a*. In some embodiments, pressurization may involve flowing gas into adsorption bed 12*a* from the top of adsorption bed 12*a*. The lightly-adsorbed component of the feed gas entering adsorption bed 12*a* may come from another adsorption bed 12, such as adsorption bed 12*b*, that is operating in an adsorption phase of a pressure swing adsorption cycle. Furthermore, the lightly-adsorbed component of the feed gas may pass through check valve 22*a*, which allows gas to travel only toward adsorption bed 12*a*. By utilizing the lightly-adsorbed component of the feed gas, adsorption bed 12*a* makes use of a contaminating gas expelled from adsorption bed 12*b* during the adsorption phase of the pressure swing adsorption process.

Valve 20*a* allows the lightly-adsorbed component of the feed gas to pressurize adsorption bed 12*a* to an adsorption pressure. Adsorption pressure may vary depending on circumstances, however in some embodiments, the adsorption pressure may be about 50 pounds per square inch absolute (psia). In some embodiments the adsorption pressure may be between approximately 35 psia and 100 psia. The pressurization phase may occur in one step. A two-step pressurization might involve, first, using nitrogen to pressurize adsorption bed 12*a* to less than adsorption pressure followed by, second, using recycle or feed gas to pressurize adsorption bed 12*a* to the adsorption pressure. In contrast, a one-step pressurization might involve use of only nitrogen. The single, full nitrogen pressurization step may pressurize adsorption bed 12*a* from, for example, evacuation pressure all the way to adsorption pressure. While a two-step pressurization may utilize a weakly-adsorbed component of feed gas to pressurize an adsorption bed 12 to approximately 20-25 psia, and then utilize feed gas, including possibly recycled feed gas, to pressurize adsorption bed 12 further up to approximately 50 psia, a one-step pressurization phase may utilize only the lightly-adsorbed component or another gas, but typically will not utilize the feed gas to reach the adsorption pressure.

By utilizing a single nitrogen pressurization, the pressure at which feed gas is first introduced to adsorption bed 12 may be much higher, resulting in a more efficient separation of the feed gas mixture components. In addition, large nitrogen and recycled gas receivers may be rendered unnecessary and therefore eliminated.

At the same time adsorption bed 12*a* is operating in a pressurization phase, adsorption bed 12*b* may operate in an adsorption phase. For example, feed gas valve 24*b* may open to allow feed gas to enter adsorption bed 12*b* at the adsorption pressure. Because the feed gas includes multiple components, with one or more components strongly-adsorbed onto adsorbent in adsorption bed 12*b* and one or more other components weakly-adsorbed onto adsorbent in adsorption bed 12*b*, these gas components, having relatively different adsorption properties, may be separated as the feed gas flows into and through adsorption bed 12*b*. For example, methane may strongly adhere to the adsorbent while nitrogen flows through adsorption bed 12*b* and out of adsorption bed 12*b* through valve 20*b*. When a weakly-adsorbed component passes out of adsorption bed 12*b* through valve 20*b*, the weakly-adsorbed component may pass through back pressure regulator 26*b* and into another adsorption bed 12, such as adsorption bed 12*a*, operating in a pressurization phase of a pressure swing adsorption process. Thus, as an example, nitrogen may pass through valve 20*b*, back pressure regulator 26*b*, check valve 22*a*, and valve 20*a* into adsorption bed 12*a* when adsorption bed 12*a* operates in a pressurization phase. While the weakly-adsorbed component of the feed gas may be directed from adsorption bed 12*b* to adsorption bed 12*a* while adsorption bed 12*b* is operating in an adsorption phase and adsorption bed 12*a* is operating in a pressurization phase, once adsorption bed 12*a* reaches the adsorption pressure, control logic 28*b* or control logic 28*a* may control appropriate valves to prevent further weakly-adsorbed gas to enter adsorption bed 12*a* and, also, open vent valve 30 to allow the weakly-adsorbed component of the feed gas to flow into atmosphere. As already discussed, control over the operation of valves in system 10 may be controlled by one or more control logics 28, such as control logic 28*b*. In some embodiments, a control logic may determine based on an expired time period that pressure in adsorption bed 12*b* should have reached adsorption pressure. Alternatively or in addition, one or more pressure transducers and/or pressure switches may be utilized to sense pressure in an adsorption bed 12. For example, a pressure transducer may communicate a pressure measurement to control logic 28*b* so that control logic 28*b* can take appropriate action. As another example, a pressure switch may sense a pressure and operate to prevent flow of gas when appropriate.

As more and more feed gas enters adsorption bed 12*b* through valve 24*b*, adsorbent in adsorption bed 12*b* may become more and more saturated. Ultimately, most or all of the adsorbent in adsorption bed 12*b* may become saturated. Thus, adsorption bed 12*b* may be filled or nearly filled with the strongly-adsorbed component of the feed gas adsorbed onto the adsorbent in adsorption bed 12*b*, as well as feed gas filling voids, or interstitial space, between adsorbent particles. To prevent feed gas from exiting adsorption bed 12*b* through valve 20*b*, control logic 28*b* may operate various valves in system 10 to step adsorption bed 12_b_ into a next phase of a pressure swing adsorption process, recycle.

At the same time adsorption bed 12_a_ operates in a pressurization phase and adsorption 12_b_ operates in an adsorption phase, adsorption bed 12_c_ may operate in a recycle phase. As adsorption bed 12_c_ enters the recycle phase, as discussed above with regard to adsorption bed 12_b_, adsorption bed 12_c_ may be filled or nearly filled with the strongly-adsorbed component of the feed gas adsorbed onto the adsorbent in adsorption bed 12_c_ as well as feed gas filling the voids between adsorbent particles. Thus, during the recycle phase, recycle valve 36_c_ may open to flow the strongly-adsorbed component of the feed gas received from compressor 18 into adsorption bed 12_c_ to displace the feed gas from the voids and push the feed gas through feed gas valve 24_c_. This recycled feed gas may be utilized by other adsorption beds 12, such as adsorption bed 12_b_ during its adsorption phase of operation. In this way, feed gas accumulated in adsorption bed 12_c_ may be recycled rather than lost during the pressure swing adsorption process.

At the same time adsorption bed 12_a_ operates in a pressurization phase, adsorption bed 12_b_ operates in an adsorption phase, and adsorption bed 12_c_ operates in a recycle phase, adsorption bed 12_d_ may operate in a depressurization phase. As adsorption bed 12_d_ enters the depressurization phase, as discussed above with regard to adsorption bed 12_c_, adsorption bed 12_d_ may be filled or substantially filled with the strongly-adsorbed component of the feed gas. Thus, depressurization valve 32_d_ may open to flow the strongly-adsorbed component of the feed gas to buffer 16. By depressurizing adsorption bed 12_d_, the strongly-adsorbed component of the feed gas, which may also be called product gas, may be obtained and stored for further use in system 10 or, ultimately, for storage and/or shipment to market or for use. In some embodiments, at different times as least some recovered product gas may be utilized by another adsorption bed 12 operating in the recycling phase, such as adsorption bed 12_c_.

At the same time other adsorption beds 12 are in various phases of a pressure swing adsorption process, adsorption bed 12_e_ may operate in an evacuation phase. Thus, while a previous depressurization phase may reduce pressure in adsorption bed 12_e_, vacuum pump 14 may operate to remove additional gas, such as the strongly-adsorbed component of the feed gas from adsorption bed 12_e_. For example, evacuation valve 34_e_ may open to flow the strongly-adsorbed gas component of the feed gas from adsorption bed 12_e_ to vacuum pump 14 and ultimately to buffer 16 for further use in system 10 or, ultimately, for storage and/or shipment to market or for use. In some embodiments, at different times as least some recovered product gas may be utilized by another adsorption bed 12 operating in the recycling phase, such as adsorption bed 12_c_.

In any of the phases of a particular pressure swing adsorption process, one or more control logics 28 may operate to open and/or close any of the various valves in system 10. For example, as illustrated, each adsorption bed 12 may be coupled to its own respective control logic 28 such that each respective control logic 28 may operate valves associated with its respective adsorption bed 12. In alternative embodiments, one control logic 28 located in an appropriate location in system 10 may control all valves in system 10. In still another alternative, any number of control logics 28 may be utilized to control any appropriate element of system 10.

Thus, gas components of the feed gas may be separated by the various components of system 10 using pressure swing adsorption processes. Furthermore, multiple adsorption beds 12 may operate together to create efficiencies. Moreover, a one-step pressurization phase may be utilized to create additional efficiencies. Thus, in a particular embodiment, a hydrocarbon gas, a strongly-adsorbed component of the feed gas, may be separated from nitrogen, a weakly-adsorbed component of the feed gas. However, in alternative embodiments, different hydrocarbons, including mixtures of hydrocarbons, may be separated from one or more different contaminating gases. Also, although system 10 illustrates one example configuration of a pressure swing adsorption system, various components may be added, removed, and/or rearranged, as appropriate. For example, as discussed above, pressure transducers and/or pressure switches may be added to system 10 as appropriate.

FIG. 2 is a simplified schematic 50 of five phases of a pressure swing adsorption process. As indicated, schematic 50 identifies a one-step pressurization phase 52, an adsorption phase 54, a recycling phase 56, a depressurization phase 58, and an evacuation phase 60. As shown, pressurization phase 52 may utilize non-adsorbed gas released from adsorption phase 54. The non-adsorbed gas, or weakly-adsorbed gas, may be utilized to pressurize a particular adsorption bed 12 to an adsorption pressure. Once pressure in adsorption bed 12 reaches the adsorption pressure, the pressurization phase may no longer utilize the non-adsorbed gas and, instead, the non-adsorbed gas may be released into the atmosphere.

Adsorption phase 54, as illustrated, may utilize the feed gas and release the non-adsorbed gas component of the feed gas either to the pressurization phase 52 or to the atmosphere. Furthermore, adsorption phase 54 may utilize recycled feed gas received from recycling phase 56. Recycling phase 56, as illustrated, may utilize product gas and release recycle feed gas. Depressurization phase 58, as illustrated, may release product gas to be utilized in recycling phase 56 and/or as an end product that can be sold at market. Evacuation phase 60, as illustrated, may also release product gas to be utilized in recycling phase 56 and/or as an end product that can be sold at market.

FIG. 3 illustrates how adsorption beds 12 may sequentially go through phase sequences in particular orders. Thus, as one example, each adsorption bed 12 stays in a phase of a pressure swing adsorption process for a particular time period, which, as illustrated, may be ninety seconds. While a particular time period has been used as an example, any appropriate time period may be selected. Any appropriate time periods may be selected, however, in some embodiments the strength of adsorption may indicate that longer depressurization and/or evacuation phases may be appropriate. Thus, for example, adsorption bed 12_a_ may step through pressurization phase 52, adsorption phase 54, recycling phase 56, depressurization phase 58, and evacuation phase 60. Moreover, during the same time periods, other adsorption beds 12 may step through the same phases in a different order. Thus, as illustrated, adsorption bed 12_b_ may step through adsorption phase 54 while adsorption bed 12_a_ steps through pressurization phase 52. Similarly, adsorption bed 12_b_ may operate in recycling phase 56 while adsorption bed 12_a_ operates in adsorption phase 54. Again, while five adsorption beds 12 are illustrated, any appropriate number of adsorption beds 12 may be utilized. However, efficiencies may be experienced by using five adsorption beds 12 in some embodiments. Furthermore, adjacent adsorption beds 12 may operate in any combination of phases at any particular time.

Figure 4:
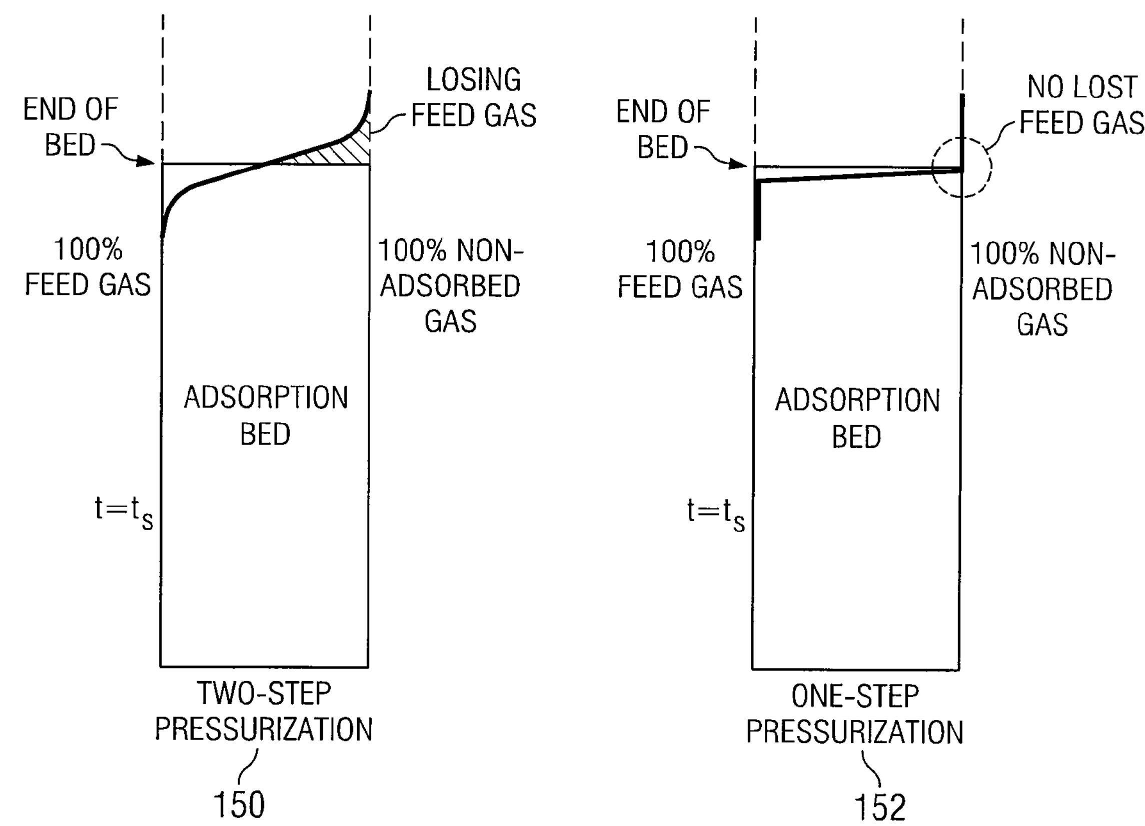
FIG. 4 illustrates advantages of using a one-step pressurization phase in a pressure swing adsorption process.

FIG. 4 illustrates efficiencies that may be experienced by utilizing, instead of a two-step pressurization 150, a one-step pressurization 152. The illustration is a snapshot of the concentration of the gases in and passing through the two adsorption beds at the same time during the adsorption phases of two pressure swing adsorption processes that utilize different pressurization phases. The two adsorption beds illustrated represent adsorption beds having the same physical size. As adsorption progresses, the adsorption beds saturate and, in each adsorption bed, an adsorption front moves toward the exit end of the adsorption bed. In front of the adsorption fronts, that is toward the exit ends of the adsorption beds, the gases in the adsorption beds include the lightly-adsorbed, also called weakly-adsorbed or non-adsorbed, gases. These are gas components of the feed gas that have not been adsorbed by adsorbent. Behind the adsorption fronts, that is away from the exit ends of the adsorption beds, gases in the adsorption beds are primarily the feed gas in the voids and the strongly-adsorbed gases on the adsorbent. Because the adsorption beds saturate and the adsorption front comes closer and closer to the exit end of the adsorption beds, the adsorption phase of the pressure swing adsorption process usually is terminated prior to the adsorption front reaching the exit ends of the adsorption beds.

The existence of the adsorption front is illustrated using a concentration gradient curve for each adsorption bed represented. The concentration gradient curve may also be termed a breakthrough curve. The concentration gradient curve indicates to what extent the gas in the adsorption bed at a particular location includes feed gas and non-adsorbed gas. The feed gas includes both strongly-adsorbed and non-adsorbed components. The non-adsorbed gas, however, substantially does not include strongly-adsorbed components.

As illustrated, two-step pressurization 150, which involves an initial pressurization using substantially only the non-adsorbed gas component of the feed gas and a secondary pressurization to the adsorption pressure using the feed gas, results in a sloped concentration gradient curve having a smooth appearance. Use of two-step pressurization 150 may result in lost feed gas, as illustrated. Losing feed gas, however, loses the strongly-adsorbed components of the feed gas. Loss of the strongly-adsorbed components, for example hydrocarbons such as methane, is an undesirable result.

Various options exist for attempting to control this problem, but many involve inefficiencies. One option may include shortening a time cycle so as not to lose feed gas. In many cases, however, reducing a time cycle results in inefficiencies or is otherwise not appropriate. Another option might include extending the length of adsorption beds 12 to prolong the time period adsorption beds 12 are useful and/or not releasing feed gas. The inefficiencies associated with losing either use of a portion of adsorption bed 12 or feed gas nonetheless would still exist depending on the time period used for the adsorption phase. Furthermore, extending adsorption bed 12 would require additional adsorbent, as well as additional recycle gas to purge feed gas from adsorption bed 12 during the recycle phase.

A more efficient solution involves creating a concentration gradient curve with a sharp edge to prevent loss of feed gas and maximize use of adsorption bed 12. Use of one-step pressurization 152 may result in a sharp concentration gradient curve. As illustrated, one-step pressurization 152, which involves one pressurization to the adsorption pressure using substantially only the non-adsorbed gas component of the feed gas, results in a concentration gradient curve with sharper edges forming a step function. Feed gas first entering adsorption bed 12 at a higher partial pressure may result in a sharper concentration gradient curve. A capacity of an adsorbent may be proportional to a partial pressure of the strongly-adsorbed component of the feed gas. Thus, a one-step pressurization phase, in which feed gas first enters adsorption bed 12 at a higher partial pressure, may allow adsorbent in adsorption bed 12 to adsorb more of the strongly-adsorbed component of the feed gas. Alternatively or in addition, adsorption of the more strongly-adsorbed component onto the adsorbent may occur more quickly at a higher partial pressure.

By eliminating a second phase of pressurization that uses feed gas to reach adsorption pressure, one or more advantages may result. As indicated, use of one-step pressurization 152 may prevent loss of feed gas when compared to two-step pressurization 150 and maximize use of the physical space of adsorption beds 12. Alternatively or in addition, receiver tanks for storing non-adsorbed gases may be eliminated or replaced with additional adsorption beds 12. As another example, smaller adsorptions beds 12 may be utilized. Furthermore, less non-adsorbed gas may be left in an adsorption bed 12 prior to transitioning to a recycle or other appropriate phase. Another advantage might include eliminating a throttle control that controls flow of feed gas because when the feed gas enters adsorption bed 12, the adsorption bed 12 is already at adsorption pressure. In other systems, a throttle control might be helpful to prevent fluidization of the adsorbent during pressurization. However, fluidization might be reduced or eliminated utilizing a one-step pressurization phase.

FIG. 5 is a flowchart illustrating a method 200 for separating gas components of a feed gas using a pressure swing adsorption system. During a pressurization phase, nitrogen enters and pressurizes adsorption bed 12 at step 202. A determination is made whether an adsorption pressure is reached at step 204. As discussed above, a pressure transducer coupled to control logic 28 or a pressure switch may determine whether the adsorption pressure is reached. Alternatively or in addition, control logic 28 alone may determine that a time period associated with reaching adsorption pressure has expired. If the adsorption pressure is not reached, method 200 returns to step 202. Alternatively, if the adsorption pressure is reached, then valve 30 vents excess nitrogen to atmosphere at step 206. At step 208, control logic 28 determines whether a preset time has expired. If the time period has not expired, method 200 returns to step 206. Alternatively, if the time period has expired, method 200 proceeds to an adsorption phase at step 210.

At step 210, feed gas 24 flows into adsorption bed 12. Valve 20 allows nitrogen to flow out of adsorption bed 12 such that nitrogen is removed from adsorption bed 12 at step 212. Back pressure regulator 26 may be utilized to maintain a constant operating pressure within adorption bed 12. Furthermore, as indicated, removed nitrogen may be used to pressurize other adsorption beds 12 that are at step 202. In some embodiments, nitrogen may flow directly from one adsorption bed 12 operating in an adsorption phase to another adsorption bed 12 operating a pressurizing phase. Control logic 28 determines whether a time period has expired at step 214. If the time period has not expired, method 200 returns to step 210. Alternatively, if the time period has expired, method 200 proceeds to a recycling phase at step 216.

Product gas flows into adsorption bed 12 at step 216 through recycle valve 36 at step 216, and feed gas flows out of adsorption bed 12 through feed gas valve 24 at step 218. Control logic 28 determines at step 220 whether a time period has expired. If the time period has not expired, method 200 returns to step 216. Alternatively, if the time period has expired, method 200 continues to a depressurization phase at step 222.

Adsorption bed 12 is depressurized at step 222. Depressurization valve 32 opens such that product gas flows out of adsorption bed 12 at step 224. Control logic 28 determines whether to use the removed product gas in the recycling phase at step 226. If the product gas will be used in the recycling phase, the product gas is utilized by another adsorption bed 12 at step 216 when that adsorption bed 12 is in the recycling phase. Alternatively, part or all of the product gas may be stored and/or sold as net product at step 228. Control logic 28 determines whether a time period has expired at step 230. If the time period has not expired, method 200 returns to step 222. Alternatively, if the time period has expired, method 200 proceeds to an evacuation phase at step 232.

Vacuum pump 14 evacuates adsorption bed 12 through evacuation valve 34 at step 232. Next, control logic 28 determines whether to use the evacuated gas in the recycling process at step 234. If the evacuated gas will not be used in the recycling process, the evacuated gas may be stored and/or sold as net product at step 228. Alternatively, if the evacuated gas will be used in the recycling process, the evacuated gas may flow to another adsorption bed 12 to be used in a recycling phase at step 216. Control logic 28 determines whether a time period has expired at step 236. If the time period has not expired, method 200 returns to step 232. Alternatively, if the time period has expired, method 200 continues to step 202.

Thus, method 200 represents a method for separating gas components of a feed gas using a pressure swing adsorption process. While method 200 indicates use of nitrogen as the weakly-adsorbed or lightly-adsorbed component of the feed gas, any other appropriate contaminating gas may be removed and/or utilized in a one-step pressurization phase as appropriate. Furthermore, although method 200 steps from one pressure swing adsorption process phase to a next pressure swing adsorption phase based on expirations of time periods, transitions from one phase to another may occur for other reasons, including detections of gas concentrations, pressures, and/or any other appropriate conditions.

The preceding flowchart illustrates a particular method for separating gas components of a feed gas. However, this flowchart illustrates only an exemplary method of operation, and system 10 contemplates devices using any suitable techniques, elements, and applications for performing these applications. Thus, many of the steps in the flowchart may take place simultaneously and/or in different orders than as shown. In addition, the devices may use methods with additional steps or fewer steps, so long as the methods remain appropriate. Moreover, other devices of system 10 may perform similar techniques to separate gas components of a feed gas.

Although the present invention has been described in several embodiments, a myriad of changes and modifications may be suggested to one skilled in the art, and it is intended that the present invention encompass such changes and modifications as fall within the present appended claims.

What is claimed is:

1. A pressure swing adsorption method for separating gas components, comprising:

pressurizing an adsorption bed to an adsorption pressure using a first gas component of a feed gas, the adsorption bed including an adsorbent for substantially adsorbing a second gas component of a feed gas;

introducing the feed gas to the pressurized adsorption bed, wherein the first gas component of the feed gas substantially passes through the pressurized adsorption bed and the second gas component of the feed gas substantially adsorbs onto the adsorbent;

terminating the introducing of the feed gas to the pressurized adsorption bed and thereafter introducing the second gas component of the feed gas to the pressurized adsorption bed to recover the feed gas in the pressurized adsorption bed;

introducing the recovered feed gas to a second adsorption bed already pressurized to the adsorption pressure, wherein the first gas component of the recovered feed gas substantially passes through the second adsorption bed and the second gas component of the recovered feed gas substantially adsorbs onto a second adsorbent in the second adsorption bed; and depressurizing the pressurized adsorption bed to recover at least a portion of the second gas component of the feed gas in the pressurized adsorption bed.

2. The pressure swing adsorption method of claim 1, further comprising:

after the first gas component of the feed gas substantially passes through the pressurized adsorption bed, introducing the first gas component of the feed gas to a second adsorption bed to pressurize the second adsorption bed to the adsorption pressure.

3. The pressure swing adsorption method of claim 2, further comprising:

after the first gas component of the feed gas substantially passes through the pressurized adsorption bed and after the second adsorption bed reaches the adsorption pressure, venting the first gas component of the feed gas to atmosphere.

4. The pressure swing adsorption method of claim 1, further comprising:

evacuating the depressurized adsorption bed to recover at least a second portion of the second gas component of the feed gas in the depressurized adsorption bed.

5. The pressure swing adsorption method of claim 4, further comprising:

introducing the recovered second portion of the second gas component of the feed gas to a second adsorption bed to recover second feed gas in the second adsorption bed.

6. The pressure swing adsorption method of claim 1, wherein the adsorption pressure is about 35 to about 100 pounds per square inch absolute (psia).

7. The pressure swing adsorption method of claim 1, wherein the feed gas is substantially natural gas comprising between about 5% and about 50% nitrogen.

8. The pressure swing adsorption method of claim 1, wherein the first gas component of the feed gas is substantially nitrogen.

9. The pressure swing adsorption method of claim 1, wherein the second gas component of the feed gas includes one or more of methane, ethane, and propane.

10. The pressure swing adsorption method of claim 1, wherein the second gas component of the feed gas is substantially methane, ethane, or propane comprising between about 0% and about 5% nitrogen.

11. A pressure swing adsorption system for separating gas components, comprising:

a first adsorption bed operable to receive a feed gas, wherein a first gas component of the feed gas substantially passes through the first adsorption bed and a second gas component of the feed gas substantially adsorbs onto an adsorbent in the first adsorption bed, the first adsorption bed further operable to transmit the first gas component of the feed gas passing through the first adsorption bed to a second adsorption bed;

a second adsorption bed coupled to the first adsorption bed, the second adsorption bed operable to receive the first gas component of the feed gas and to pressurize the second adsorption bed to an adsorption pressure using the first gas component of the feed gas; and a third adsorption bed coupled to the first adsorption bed, the third adsorption bed operable to receive the second gas component of the feed gas and to displace feed gas in the third adsorption bed.

12. The pressure swing adsorption system of claim 11, wherein the first adsorption bed is further operable to receive the feed gas only after the first adsorption bed is pressurized to the adsorption pressure using the first gas component of the feed gas.

13. The pressure swing adsorption system of claim 11, wherein the first adsorption bed is further operable to transmit the first gas component of the feed gas passing through the first adsorption bed to the second adsorption bed without storing the first gas component of the feed gas.

14. The pressure swing adsorption system of claim 11, further comprising:

a vent valve coupled to the second adsorption bed, wherein the vent valve is operable to vent the first gas component of the feed gas to atmosphere when the second adsorption bed reaches the adsorption pressure.

15. The pressure swing adsorption system of claim 11, further comprising:

a fourth adsorption bed; and a product buffer coupled to the fourth adsorption bed, the product buffer operable to receive and store the second gas component of the feed gas from the fourth adsorption bed.

16. The pressure swing adsorption system of claim 11, further comprising:

a fifth adsorption bed; and a vacuum pump coupled to the fifth adsorption bed, wherein the vacuum pump is operable to evacuate the second gas component of a feed gas from the fifth adsorption bed.

17. The pressure swing adsorption system of claim 11, wherein the adsorption pressure is about 35 to about 100 pounds per square inch absolute (psia).

18. The pressure swing adsorption system of claim 11, wherein the feed gas is substantially natural gas comprising between about 5% and about 50% nitrogen.

19. The pressure swing adsorption system of claim 11, wherein the first gas component of the feed gas is substantially nitrogen.

20. The pressure swing adsorption system of claim 11, wherein the second gas component of the feed gas includes one or more of methane, ethane, and propane.

21. The pressure swing adsorption system of claim 11, wherein the second gas component of the feed gas is substantially methane, ethane, or propane comprising between about 0% and about 5% nitrogen.

22. A pressure swing adsorption system for separating gas components, comprising:

a plurality of adsorption beds, each respective adsorption bed including an adsorbent;

a plurality of check valves, each respective adsorption bed coupled to a respective check valve, each respective check valve operable to control flow of gas such that a first gas component of a feed gas received from another adsorption bed flows through the check valve into the respective adsorption bed to pressurize the respective adsorption bed to an adsorption pressure;

a plurality of feed valves, each respective adsorption bed coupled to a respective feed valve, each respective feed valve operable to control flow of gas such that after the respective adsorption bed reaches the adsorption pressure the feed gas flows through the feed valve into the respective adsorption bed, the first gas component of the feed gas substantially passing through the respective adsorption bed and a second gas component of the feed gas substantially adsorbing onto the adsorbent in the respective adsorption bed;

a plurality of back pressure regulators, each respective adsorption bed coupled to a respective back pressure regulator, each respective back pressure regulator operable to regulate a back pressure such that the first gas component of the feed gas passing through the respective adsorption bed flows through the back pressure regulator to a second adsorption bed to pressurize the second adsorption bed to the adsorption pressure; and a plurality of recycle valves, each respective adsorption bed coupled to a respective recycle valve, each respective recycle valve operable to control flow of gas such that the second gas component of the feed gas flows through the recycle valve into the respective adsorption bed to displace feed gas in voids of the respective adsorption bed.

23. The pressure swing adsorption system of claim 22, further comprising:

a vent valve coupled to each adsorption bed;

wherein the vent valve is operable to control flow of gas such that the first gas component of the feed gas flows through the vent valve to atmosphere when the respective adsorption bed reaches the adsorption pressure.

24. The pressure swing adsorption system of claim 22, further comprising:

a product buffer coupled to each adsorption bed; and a plurality of depressure valves, each respective adsorption bed coupled to a respective depressure valve, each respective depressure valve operable to control flow of gas such that the second gas component of the feed gas flows through the depressure valve into the product buffer to recover the second gas component of the feed gas in the respective adsorption bed.

25. The pressure swing adsorption system of claim 22, further comprising:

a vacuum pump coupled to each adsorption bed;

a product buffer coupled to the vacuum pump; and a plurality of evacuation valves, each respective adsorption bed coupled to a respective evacuation valve, each respective evacuation valve operable to control flow of gas such that the vacuum pump evacuates the second gas component of the feed gas from the respective adsorption bed through the respective evacuation valve and the product buffer stores the evacuated second gas component of the feed gas.

26. The pressure swing adsorption system of claim 22, further comprising:

a product buffer coupled to each adsorption bed; and a compressor coupled to the product buffer, wherein the compressor is operable to compress the second gas component of the feed gas received from the product buffer.

27. The pressure swing adsorption system of claim 22, wherein the adsorption pressure is about 35 to about 100 pounds per square inch absolute (psia).

28. The pressure swing adsorption system of claim 22, wherein the feed gas is substantially natural gas comprising between about 5% and about 50% nitrogen.

29. The pressure swing adsorption system of claim 22, wherein the second gas component of the feed gas includes one or more of methane, ethane, and propane.

30. The pressure swing adsorption system of claim 22, wherein the second gas component of the feed gas is substantially methane, ethane, or propane comprising between about 0% and about 5% nitrogen.

31. The pressure swing adsorption system of claim 22, wherein the first gas component of the feed gas is substantially nitrogen.

32. A pressure swing adsorption system for separating gas components, comprising:

means for pressurizing an adsorption bed to an adsorption pressure using a first gas component of a feed gas, the adsorption bed including an adsorbent for substantially adsorbing a second gas component of a feed gas;

means for introducing the feed gas to the pressurized adsorption bed, wherein the first gas component of the feed gas substantially passes through the pressurized adsorption bed and the second gas component of the feed gas substantially adsorbs onto the adsorbent;

means for terminating the introducing of the feed gas to the pressurized adsorption bed and thereafter introducing the second gas component of the feed gas to the pressurized adsorption bed to recover the feed gas in the pressurized adsorption bed;

means for introducing the recovered feed gas to a second adsorption bed already pressurized to the adsorption pressure, wherein the first gas component of the recovered feed gas substantially passes through the second adsorption bed and the second gas component of the recovered feed gas substantially adsorbs onto a second adsorbent in the second adsorption bed; and means for depressurizing the pressurized adsorption bed to recover at least a portion of the second gas component of the feed gas in the pressurized adsorption bed.

* * * * *